United States Patent Office 3,164,562
Patented Jan. 5, 1965

3,164,562
VINYL ACETATE EMULSION
Carolyn E. Breed, Chestnut Hill, Mass., assignor to W. R. Grace & Co., Cambridge, Mass., a corporation of Connecticut
No Drawing. Filed Oct. 14, 1960, Ser. No. 62,545
6 Claims. (Cl. 260—29.6)

This invention is concerned with an improved polyvinyl acetate type of emulsion useful as a vehicle for water based paints, a paper coating agent, an adhesive, a textile impregnant, and in other fields known to the art wherein emulsions of vinyl acetate homopolymer and copolymers find use.

The vinyl acetate polymer emulsions of this invention are characterized by their microparticle size and excellent mechanical and chemical stabilities, with the use of minimum amounts of emulsifiers. They are exceptionally freeze-thaw stable, calcium ion stable and stable to the addition of electrolytes such as sodium bicarbonate in rather large quantities. When used as a paint vehicle, the films obtained from the vinyl acetate polymer emulsions of this invention are flexible, remarkably speck-free, and quite water insensitive and resistant to spotting.

Polymeric vinyl acetate emulsion systems comprising a vinyl acetate polymer dispersed in water with suitable nonionic and ionic surfactants are known, e.g., see U.S. 2,833,737. The emulsion systems are usually formed by the emulsion polymerization of the monomers. The vinyl acetate is customarily copolymerized with another monomer, usually an ester of an unsaturated acid, that serves as an internal plasticizer. The polymerization process is carried out by adding incremental amounts of the monomer phase to the aqueous phase which contains the electrolytes and surfactants besides the free radical producing initiator.

The improved results of this invention are obtained by modifying a vinyl acetate polymer via the incorporation of two types of stabilizing monomers in the polymer chain, i.e. a monomer providing carboxylic acid groups and a monomer providing amide groups. Minor amounts, based on the basic vinyl acetate resin, of an $\alpha$-$\beta$ unsaturated carboxylic acid and an $\alpha$-$\beta$ unsaturated amide are interpolymerized with the vinyl acetate. The $\alpha$-$\beta$ unsaturated acid preferably contains three to six carbon atoms. Suitable acids are acrylic, butenoic acids such as crotonic, itaconic, maleic and fumaric, with the latter dicarboxylic acid being preferred. The amide preferably contains 3 to 5 carbon atoms. Suitable amides are methacrylamide, the half amide of maleic acid, the diamide of itaconic, and acrylamide, with the latter monofunctional amide being preferred.

The amount of amide used is 0.2–5.0, preferably 0.5–1.0, weight percent on the basic vinyl acetate resin constituents, i.e. the vinyl acetate and its plasticizing comonomer if any. An excessive amount of the amide is undesirable because it adversely affects water sensitivity of the vinyl acetate polymer film. The amount of carboxylic acid used is 0.05–5.0, preferably 0.1–1.0, weight percent on the vinyl acetate resin. The amide is preferably added to the emulsion polymerization system via the monomer phase and the carboxylic acid is preferably added with the aqueous phase.

The vinyl acetate interpolymers in the emulsion system of this invention have an average particle size in the range of 900 to 2000 A. The particle size of the emulsion can be controlled to some extent by the conditions and manner of polymerization as is known to the art. Unduly small particle sizes, under about 500 A., may result in mechanical instability.

The following formulation is an example of this invention:

TABLE I

| Monomer phase: | |
|---|---|
| Vinyl acetate | 77.00 |
| Dibutyl maleate (internal plasticizer) | 23.00 |
| | 100.00 |
| Acrylamide (stabilizing monomer) | 0.70 |
| Water | 0.15 |
| Nonyl - phenol-ethylene oxide condensation product [1] (nonionic surfactant) | 1.25 |
| Aqueous phase: | |
| Sodium octyl benzene sulfonate [2] (anionic surfactant) | 0.8 |
| Sodium citrate (buffer, electrolyte) | 0.16 |
| Sodium acetate (buffer, electrolyte) | 0.45 |
| Potassium persulfate (initiator) | 0.30 |
| Fumaric acid (stabilizing monomer) | 0.161 |
| Water—sufficient for 57 weight percent total solids in final emulsion. | |
| Acetic acid—sufficient to adjust pH of aqueous phase to 4.6–4.7. | |

[1] Igepal CO–880, consists of 88 moles of the oxide per mole nonyl phenol.
[2] Ultrawet DS.

The vinyl acetate and dibutyl maleate are the basic resin constituents and the proportions of the other ingredients are expressed by weight thereon. Water in the approximate amount of ¼ by weight of the acrylamide is used to solubilize the acrylamide in the monomer phase. This amount may vary, or may or may not be necessary, depending on the type of amide and the monomer system. Calcium ion stability of the emulsion is in part dependent on the concentration of the sodium acetate, besides the two surfactants. The sodium acetate, besides working with the surfactants, also affects monovalent ion stability, viscosity and water sensitivity. It should be used in the amounts in the range of 0.3 to 0.6 weight percent, based on the vinyl acetate resin, for citrate concentrations of about 0.1 to 0.2 weight percent. The sodium acetate also reduces the amount of the sodium citrate required, which is desirable since sodium citrate is relatively expensive.

It is desirable to use a nonionic surfactant in conjuncition with an anionic surfactant. Other nonionic detergents that can be used are fatty alcohol-alkylene oxide condensation products and copolymers based on ethylene and propylene oxides (the Pluronics). Suitable alternative ionic dispersants are those which form soluble calcium salts, such as the alkyl sulfates (sodium lauryl sulfate). The amount of ionic detergent or soap used should be sufficient to prevent coagulation. Excessive amounts are undesirable because they decrease the particle size of the resin, as is known to the art.

Other internal plasticizers that can be used are the unsaturated carboxylic acid esters typified by the $C_4$–$C_8$ diesters of maleic and fumaric acids, and the $C_4$–$C_8$ esters of acylic and methacrylic acids. The ratio of the comonomer to the vinyl acetate may vary from 0 to 1:1.

Equivalent free radical producing initiators that can be used are ammonium persulfate, sodium persulfate, hydrogen peroxide and gamma radiation.

With reference to the example of Table I, a polymerization process that can be used to prepare and react the monomers is as follows. The monomer phase is separately prepared by simple admixing of the ingredients. The aqueous phase, except for the catalyst, is mixed in the reaction vessel and brought up to about 80° C. The catalyst is then added and addition of the monomer is started with about ⅓ of it being added fairly rapidly and the remainder of the monomer phase being added slowly over a period of a few hours. The temperature will rise to 80–85° C. The system is allowed to react after addition of all the monomer phase until the free monomer content is less than 1 weight percent, on total latex, as determined by spectroscopic methods (ultraviolet or infrared). The reaction mass is then cooled and the pH is adjusted to about 5.0–5.3, e.g. 5.2 by the addition of sodium bicarbonate It has been found that the monomer addition rate affects freeze-thaw stability. Preferably ⅓–½ of the monomer phase is added before the temperature of the system exceeds about 75–85° C. and the remainder is then added at such a rate that the concentration of free monomer in the system after ½ of the monomer has reacted does not exceed 20 weight percent at any one time. The monomer is a solvent for the polymer. Excessive amounts of the free monomers in the emulsion lead to particle agglomeration and are to be avoided.

It was also found that the amount of nonionic surfactant relative to the amount of unreacted monomer should be controlled by slow addition thereof rather than having it all present at the start in the aqueous phase. In the above formulation this slow addition is achieved by adding the nonionic with the monomer phase, although it could as well be added separately. While the carboxylic acid stabilizing monomer is shown as being present in the aqueous phase, it could also be added separately or with the monomer phase depending on its solubility.

The emulsion obtained, as described above, was tested in the following tests and found to be satisfactory:

*Freeze-Thaw Stability*

A two-ounce sample is placed in a four-ounce jar and frozen over night at −20° F. It is thawed at room temperature, and the condition of the emulsion is observed. If no coagulation is observed after 5 cycles, the emulsion is considered to be satisfactory.

*Specks*

A two-mil film (after drying) is cast from emulsion, and the appearance of the film is graded on the basis of the number of small specks present in the film. This is usually done visually but may be done under a microscope in which case the maximum number of specks for an acceptable emulsion is 20 per square centimeter.

*Water Sensitivity*

From a film of about 4 mils thickness when dry, a portion is cut about 1¼ inches square and placed in water for 24 hours. At the end of this time the color is noted—clear, faintly blue, blue very slightly cloudy, cloudy, white, etc. The changes in the dimensions of the film are measured. An acceptable polymer must not increase in size by more than 50%.

*Sodium Bicarbonate Stability*

100 grams of the emulsion is screened through a 100 mesh screen and treated with enough of a 50 percent sodium bicarbonate slurry to neutralize it to a pH of 5.0–5.2. This is then screened through a 100 mesh screen and the coagulum is noted. A satisfactory emulsion will not produce any coagulum.

*Calcium Ion Stability*

About 20 grams of the emulsion is screened through a 100 mesh screen and treated with an equal amount of a 20 percent (anhydrous) calcium chloride solution. The treated emulsion is then screened through a 100 mesh screen, and the coagulum is noted. No coagulum is considered excellent.

The particle size of the emulsion is determined by light-scattering methods. See "Determination of Average Particle Size of Synthetic Latices by Turbidity Measurements," A. B. Loebel, Official Digest 31: 200–210 (1959).

A water based paint can be prepared from the emulsion of Table I in the following manner.

TABLE II

| | Lbs. |
|---|---|
| Dispersion: | |
| Water | 150.0 |
| Polyethylene glycol alkylphenyl ether (Nonic 300) | 1.0 |
| Sodium salt of polycarboxylic acid, 35% in water (Daxad 30) | 2.0 |
| Ammonium salt of a sulfate ester of an alkyl phenoxy poly (ethyleneoxy) ethanol (Alipal CO–436) | 6.0 |
| Phenyl mercuric acetate, 18% in glycol | 1.0 |
| Ethylene glycol | 40.0 |
| Rutile $TiO_2$ (Titanox RA–50) | 200.0 |
| Water ground natural $CaCO_3$ (Duramite) | 150.0 |
| Water ground clay (ASP–400) | 50.0 |
| Calcined clay (Alsilate W) | 50.0 |
| Reduction: | |
| Emulsion of Table I | 286.0 |
| Diethylene glycol mono ethyl ether acetate (Cellosolve Acetate) | 10.0 |
| 3% hydroxyethyl cellulose (QP–4400) | 100.0 |
| Water | 114.7 |
| Totals | 1160.7 |

The first six items are all combined in a Cowles dissolver using as little of the water as possible. This helps to minimize the amount of air entrapped in the dispersion. The next four items are then added in the order given. The mixture is ground until a smooth, homogeneous paste is obtained. Agitation is reduced to a minimum, and the remaining water is added. An antifoamant may be used if necessary. The consolidating agent (Cellosolve Acetate) is then added followed by the emulsion. The thickening agent and water are added, and the mixing is continued until the batch is uniform.

This paint has good color acceptance and uniformity over green plaster and joint sealer. It is freeze-thaw stable and has good enamel holdout.

In formulating paints, paper coatings and the like, it is desirable in many cases to add an external plasticizer to the system to improve film consolidation. Suitable external plasticizers are butyl Cellosolve acetate, glycol diacetate, 2-ethyl hexyl sebacate and similar esters. They are used in the amount of approximately 1 to 10 weight percent based on resin.

Having described this invention what is sought to be protected by Letters Patent is succinctly set forth in the following claims.

I claim:

1. A vinyl acetate polymer emulsion comprising an aqueous dispersion of a surfactant and an interpolymer comprising vinyl acetate, 0.2 to 5.0 weight percent of an $\alpha,\beta$-unsaturated amide containing 3 to 5 carbon atoms and 0.05 to 5.0 weight percent of an $\alpha,\beta$-unsaturated carboxylic acid containing 3 to 6 carbon atoms, said amide and acid being based on the weight of the vinyl acetate.

2. A vinyl acetate polymer emulsion comprising an aqueous dipersion of a surfactant and an interpolymer comprising 1 part by weight of vinyl acetate, 0 to 1 part by weight of a plasticizing monomer selected from the group consisting of $C_4$–$C_8$ monoesters of acrylic and methacrylic acids and $C_4$–$C_8$ diesters of maleic and fumaric acids, 0.2 to 5.0 weight percent of an $\alpha,\beta$-unsaturated amide containing 3 to 5 carbon atoms and 0.05 to 5.0 weight percent of an $\alpha,\beta$-unsaturated carboxylic acid containing 3 to 6 carbon atoms the amount of said amide and acid being on the total weight of vinyl acetate and plasticizing monomer.

3. An emulsion according to claim 2 wherein said amide is acrylamide and said acid is fumaric acid.

4. An emulsion according to claim 2 wherein said surfactant comprises a mixture of a nonionic surfactant and an anionic surfactant, said nonionic surfactant being selected from the group consisting of fatty alcohol-alkylene oxide condensates and copolymers of ethylene and propylene oxides and said anionic surfactant being one which forms soluble calcium salts.

5. A vinyl acetate polymer emulsion comprising an aqueous dispersion of a mixture of surfactants consisting of 1.25 weight percent of a nonyl-phenol-ethylene oxide condensation product and 0.8 weight percent of sodium octyl benzene sulfonate, and an interpolymer comprising 77 weight percent vinyl acetate, 23 weight percent dibutyl maleate, 0.70 weight percent acrylamide, and 0.16 weight percent fumaric acid, the amount of said surfactants, acid, and amide being based on the total weight of vinyl acetate and dibutyl maleate.

6. An emulsion polymerization process which comprises
 (A) providing a monomer phase comprising
  (1) 1 part by weight of vinyl acetate,
  (2) 0 to 1 part by weight of a plasticizing monomer selected from the group consisting of $C_4$–$C_8$ monoesters of acrylic and methacrylic acids and $C_4$–$C_8$ diesters of maleic and fumaric acids,
  (3) under 5 weight percent based on the weight of vinyl acetate and plasticizing monomer of an $\alpha,\beta$-unsaturated amide containing 3 to 5 carbon atoms, and
  (4) a nonionic surfactant selected from the group consisting of fatty alcohol-alkylene oxide condensates and copolymers of ethylene and propylene oxides,
 (B) providing an aqueous phase comprising
  (1) water,
  (2) an anionic surfactant which forms soluble calcium salts,
  (3) under 5 weight percent based on the weight of vinyl acetate and plasticizing monomer in the monomer phase of an $\alpha,\beta$-unsaturated carboxylic acid containing 3 to 6 carbon atoms, and
  (4) a free radical-producing initiator,
 (C) rapidly adding ⅓ to ½ of said monomer phase to said aqueous phase,
 (D) thereafter adding the remainder of said monomer phase at a rate that will not increase the free monomer content of the aqueous phase above 20 weight percent,
 (E) continuing the reaction after addition of all of the monomer phase until said free monomer content is less than 1 weight percent, and
 (F) thereafter adjusting the pH of the resulting emulsion to a value in the range of 5.0 to 5.3.

References Cited in the file of this patent
UNITED STATES PATENTS

| | | |
|---|---|---|
| 2,534,108 | De Nie et al. | Dec. 12, 1950 |
| 2,625,529 | Hedrick et al. | Jan. 13, 1953 |
| 2,753,318 | Maeder | July 3, 1956 |
| 2,806,020 | Scott et al. | Sept. 10, 1957 |
| 2,833,737 | Mark et al. | May 6, 1958 |
| 2,886,474 | Kine et al. | May 12, 1959 |
| 3,003,987 | Hager et al. | Oct. 10, 1961 |